United States Patent [19]

Yamamoto et al.

[11] Patent Number: 5,223,052
[45] Date of Patent: Jun. 29, 1993

[54] METHOD OF TREATING SURFACES OF ROTORS OF THE SCREW TYPE ROTARY MACHINE

[75] Inventors: Akihiko Yamamoto; Toshihiro Yamada, both of Ibaraki; Tatsuo Natori, Kashiwa; Kotaro Naya, Shimizu; Motohiro Satoo; Mitsuru Fujiwara, both of Ibaraki; Katsumi Matsubara, Ushiku; Kazuaki Shiinoki, Shimizu; Hirotaka Kameya, Ibaraki, all of Japan

[73] Assignee: Hitachi, Ltd., Tokyo, Japan

[21] Appl. No.: 680,071

[22] Filed: Apr. 3, 1991

[30] Foreign Application Priority Data

Apr. 6, 1990 [JP] Japan .................. 2-090093

[51] Int. Cl.⁵ .............................................. C21D 9/22
[52] U.S. Cl. ................... 148/587; 427/305; 427/319; 427/374.1; 427/374.2; 427/374.3; 427/388.1; 427/438; 428/612; 428/614; 428/622; 428/623; 428/626; 428/679; 428/680; 428/936
[58] Field of Search ............... 148/14, 127, 587; 427/305, 319, 374.1, 374.2, 374.3, 388.1, 438; 428/679, 680, 626, 622, 623, 614, 612, 609, 936

[56] References Cited

U.S. PATENT DOCUMENTS 4,621,026 11/1986 Robinson ................... 427/374.1
4,666,786 5/1987 Yano et al. ..................... 428/612
5,017,410 5/1991 Hodgens, II ................... 427/438

FOREIGN PATENT DOCUMENTS 0281654 9/1988 European Pat. Off. .
61-68238 4/1986 Japan ............................. 428/679
762553 11/1956 United Kingdom .
1181460 2/1970 United Kingdom .
1306352 2/1973 United Kingdom .
2121112 12/1983 United Kingdom .

Primary Examiner—R. Dean
Assistant Examiner—Robert R. Koehler
Attorney, Agent, or Firm—Antonelli, Terry, Stout & Kraus

[57] ABSTRACT

A method treating a surface of rotors in a screw-type rotary fluid machine, with the method comprising the steps of: conducting a non-electrolytic Ni plating on the surface of each rotor so as to form a first layer of non-electrolytic Ni plating layer; heating the rotor having the first layer at a temperature not lower than 500° C.; and forming, at least, a second layer of an organic resin so as to cover the first layer.

8 Claims, 5 Drawing Sheets

METHOD OF TREATING SURFACES OF ROTORS OF THE SCREW TYPE ROTARY MACHINE

BACKGROUND OF THE INVENTION

1. Field of the Invention

The present invention relates to a method of treating surfaces of rotors of a screw-type rotary fluid machine suitable for use as a compressor, blower or a vacuum pump and to a method for treating surfaces of rotors of a corrosion-resistant, low-noise and low-friction screw-type rotary fluid machine which is suitable for use as a dry-type fluid machine

2. Description of the Related Art

In general, a screw-type rotary fluid machine has a male rotor and a female rotor which are accommodated in a casing and which rotate in meshing engagement with each other, so that a space defined by both rotors and the casing is progressively shifted in the direction of axis of the casing while reducing its volume, thereby compressing or pressurizing a fluid confined in the space.

There are two types of screw rotary fluid machines, namely, an oil-cooled type machine in which a lubricating oil is supplied into the machine together with the fluid to be compressed so as to cool the rotors and the casing while providing lubrication between the rotors and the casing and between the meshing rotors, and a dry-type machine in which no oil is supplied into the machine In the oil-cooled type machine, the male rotor and the female rotor contact each other through the intermediary of an oil film. As the male rotor is driven by a motor through a drive gear, the female rotor is driven by the male rotor so as to rotate in synchronization with the male rotor. Thus, the construction of the machine is comparatively simple because no independent driving mechanism is necessary for driving the female rotor.

In addition, the oil supplied to the machine effectively cools the rotors so as to prevent seizure of both rotors which may otherwise be caused by the friction heat generated during rotation of these rotors.

The oil-cooled type machine, however, has a in that it cannot be used in handling fluids which are strictly required to be clean, e.g., fluids used in food industries and high-technology industries.

In contrast, a dry-type machine can provide clean fluid because no oil is suspended in the fluid discharged from this type of machine. However, in this type of machine, both rotors rotate without contacting each other. It is therefore necessary to employ synchronizing gears on one end of each of the rotors so as to synchronize the rotational phases of both rotors. Consequently, the construction of this type of machine. is complicated as compared with oil-cooled type machine Another problem is that, since both rotors do not contact each other, fluid tends to leak through the gap between both rotors so as to reduce compression efficiency.

Thus, both the oil-cooled type machine and the dry-type machine have advantages and disadvantages.

In for example, Japanese Patent Laid-Open No. 56-75992, a screw-type fluid machine is disclosed which can be constructed both as an oil-cooled type machine and dry-type machine. This type of machine will be referred to hereinafter as the as "first machine". In this first machine, the surfaces of both rotors are coated with a soft metal or a plastic so that the rotors can smoothly contact each other while preventing leak of fluid, thus achieving a high compression efficiency.

In Japanese Patent Laid-Open No. 58-148292 a method is disclosed in which a plastic, rubber or molybdenum disulfide is applied to the surfaces of the rotor so as to reduce the gap between the rotors, thus improving the compression efficiency. This method will be hereinafter referred to as "first method.".

In Japanese Patent Laid-Open No. 48-2308, a dry-type machine is disclosed in which both rotors are formed of sintered bodies and is impregnated with an oil such that the oil is held in the micro-pores between particles of the sintered bodies, thereby reducing friction between both rotors and, hence, wear of these rotors. This machine will hereinafter be referred to as the "second machine".

Japanese Patent Publication No. 61-47992 discloses a machine wherein synchronizing gears, provided on the end of each of the rotors, mesh with each other so as to prevent any contact between both rollers which are designed to rotate without contacting each other, wherein the shapes and sizes of both rotors are determined beforehand so as to avoid an occurrence of mutual contact of the rotors due to rise of temperature of both rotors during operation of the machine. This machine will be referred to hereinafter as "fourth known art," the "third machine".

In the "first machine" explained above, the surfaces of the rotors are coated with a soft metal or a plastic. Therefore, when a corrosive fluid is handled, the soft metal or the plastic and, finally, the surfaces of the rotors are corroded. Thus, the "first machine" could not be used practically for corrosive gases.

In the "first method" described above, the surfaces of both rotors are coated with plastic, rubber or molybdenum disulfide. As a result of repeated contact between both rotors during the operation of the machine, the films on both rotors are damaged and finally cause excoriation from the rotor surfaces. In order that the required resistances to wear and corrosion may be provided by the plastic or rubber coating layer alone, the coating layer is required to have a thickness of 0.1 mm to several centimeters. Such a thick coating layer inherently has a risk of separation from the rotor material due to difference in the thermal expansion coefficient. Thus, the second known art is still unsatisfactory from the view point of performance, reliability and noise.

In the first machine and "first method" as described above, the surfaces of the rotors are directly treated by coating or application, and the required resistances to wear and corrosion are provided solely by the layer formed by the surface treatment. Consequently, the surface layer is liable to be damaged or separated in a short time after the start of operation of the screw-type fluid machine, causing a reduction in the compression performance and increase in the noise level. In the worst case, the operation of the screw-type fluid machine has to be stopped.

The "second machine" described above, a disadvantage resides in the fact the machine cannot provide clean fluid which is an essential requirement for dry-type machines, due to the fact the rotors made of sintered bodies are impregnated with an oil.

With regard to the "third machine" described above, mutual contact between the rotors during the operation is materially unavoidable due to, for example, a machining error, even though the rotation of both rotors are synchronized to effect non-contact rotation of both rotors. In addition, there is a risk that any foreign matter in the fluid is jammed between the rotors. If the rotor surfaces are not suitably treated, therefore, the rotor surfaces are soon damaged to cause problems such as a reduction in the compression efficiency and generation of noise.

SUMMARY OF THE INVENTION

Accordingly, a first object of the present invention is to provide a method for treating surfaces of rotors of a screw-type rotary fluid machine, in which noise and friction are reduced and an intimate contact between both rotors is increased by a suitable surface treatment of the rotor surfaces.

A second object of the present invention is to provide a method for treating the surfaces of rotors of the machine, in which the rotor surfaces are suitably treated to positively allow mutual contact between both rotors, so as to eliminate the shortcomings inherent in dry-type machines, while keeping the advantages possessed by the dry type and oil-cooled type machines.

To achieve the first object, the present invention provides a screw-type rotary fluid machine, comprising at least one male rotor and at least one female rotor which rotate within a casing, with the male and/or female rotors being surface-treated to have a treated surface structure.

The treated surface structure is preferably a multi-layered structures composed of a plurality of layers for improving wear resistance and corrosion resistance.

The multi-layered treated surface structure includes a non-electrolytic plating layer and at least one covering layer or organic resin, so as to further improve wear resistance and corrosion resistance.

Preferably, the multi-layered treated surface structure includes a non-electrolytic Ni plating layer and at least one covering layer of organic resin, so as to further improve wear resistance and corrosion resistance.

It is preferred that a plurality of coating layers of different organic resins are formed to reduce noise level during operation of the machine.

Preferably, the organic resin is one or more types selected from a group of engineering plastics, so as to improve mechanical strength.

The engineering plastic is preferably one or more types selected from a group consisting of poly sulfone resins, polyethylene terephthalate resins, polyamide resins, polyphenylene sulfide resins, polyimide resins, fluoric resins and epoxy resins.

To achieve the first object, the present invention also provides a screw-type rotary fluid machine, comprising at least one male rotor and at least one female rotor which rotate within a casing with or without contacting each other, with the male and female rotors having different types of treated surface structures.

In order to improve wear resistance and corrosion resistance, one of the male and female rotors has a treated surface structure composed of a non-electrolytic Ni plating layer, while another of the rotors has a treated surface structure composed of a plurality of organic resin layers.

To achieve the first object, the present invention also provides a method comprising the steps of conducting a non-electrolytic Ni plating on the surface of each rotor so as to form a first layer of non-electrolytic Ni plating layer; heating the rotor having the first layer at a temperature not lower than 500° C.; and forming second layer of an organic resin or a plurality of layers of organic resins so as to cover the first layer.

To achieve the first object, the present invention also provides a method comprising the steps of conducting a non-electrolytic Ni plating on the surface of each rotor so as to form a first layer of non-electrolytic Ni plating layer; heating the rotor having the first layer at a temperature ranging between 300° C. and 500° C.; cooling the rotor to generate cracks in the non-electrolytic Ni plating layer; heating the rotor having the non-electrolytic Ni plating layer at a temperature not lower than 500° C., and forming, at least, a second layer of an organic resin so as to cover the first layer.

Preferably, the second layer is formed by one of injection forming and electro-deposition with one type of resin selected from a group of engineering plastics having high mechanical strength, and a further covering layer is formed to cover the second layer through injection forming by use of one kind of resin or a mixture of two or more resins selected from the group of the engineering plastics In an alternative form of the method of the invention, the second layer is formed by one of injection forming and electro-deposition with a mixture of resins selected from a group of engineering plastics, and a further covering layer is formed to cover the second layer through injection forming by use of one kind of resin selected from the group of engineering plastics.

To achieve the second object described before, the present invention provides a dry screw-type rotary fluid machine comprising at least one male rotor and at least one female rotor which rotate within a casing, with the male and female rotors being surface-treated to have surface-treated surface structures and being arranged to rotate in contact with each other.

In order to attain a higher adhesion between the rotor surface and the treated surface structure, the treated surface structure is formed by applying, to the surface of each rotor, a non-electrolytic Ni plating material, and heat-treating the rotor surface carrying the non-electrolytic Ni plating layer, thereby producing fine crystal grain structure in the non-electrolytic Ni plating layer while allowing diffusion of constituents at the boundary layer between the rotor surface and the non-electrolytic Ni plating layer.

The non-electrolytic Ni plating material may be selected from a group consisting of Ni-P and Ni-B.

The non-electrolytic Ni plating layer may be a porous layer and may be impregnated with a solid lubricant, in order to reduce friction without causing any contamination of the fluid handled by the machine.

The solid lubricant may be selected from a group consisting of BN (boron nitride), $MoS_2$ (molybdenum disulfide), a fluoric resin and carbon fluoride.

To achieve a second object, the present invention also provides a method of treating the surfaces of rotors in a dry screw-type rotary fluid machine, comprising the steps of forming a non-electrolytic Ni plating layer on the surface of each roll, and heat-treating the rotor surface carrying the non-electrolytic Ni plating layer at a temperature ranging between 500° C. and 650° C., thereby producing fine crystal grain structure in the non-electrolytic Ni plating layer while allowing diffusion of constituents at the boundary layer between the rotor surface and the non-electrolytic Ni plating layer.

According to the first aspect of the present invention, the rotor surface is treated to have a treated surface structure composed of a plurality of layers. More particularly, a non-electrolytic Ni plating layer is formed as a first layer on the rotor surface, and the second layer or more made of organic resins are formed successively on this first layer.

An experiment was conducted in which non-electrolytic Ni plating layer containing substantially 10 wt % of phosphor (P) was formed on sample pieces of an ordinary cast iron and, after heat treatment at different temperatures, the numbers of cracks in the plating films on the sample pieces were measured. As will be seen from Table 1 showing the test results, large numbers of cracks are found on samples which are treated at temperatures between 300° C. and 500° C. However, the number of the cracks is decreased and reduced to zero as the heat-treating temperature exceeds 500° C. This means that the plating layer exhibits superior resistances both to wear and corrosion. That is, because of the heat treatment effected at a temperature not less than 500° C., both the toughness and hardness of the plating film is enhanced and both Ni in the plating film and Fe in main body metal are mutually diffused thereinto to thereby improve the bonding between the plating film and the rotor main body, so that the wear resistance is remarkably increased. In addition, the inherent cracks come to disappear in the plating film by the heat treatment effected at a temperature not more than 500° C., so that the corrosion resistance is improved.

TABLE 1

| | 200° C. | 300° C. | 400° C. | 500° C. | 550° C. | 650° C. |
|---|---|---|---|---|---|---|
| Number of cracks (as observed in region of 10 mm long) | 0 | 14 | 4 | 3 | 0 | 0 |

On the other hand, organic resins are superior in resistance to chemical agents, not to mention water, and are generally soft as compared with metals. The organic resin, therefore, effectively absorb noise generated as a result of contact between the resin layers of both rotors during the operation of the screw-type rotary machine. Therefore, by conducting a surface treatment for forming a multi-layered surface structure having at least two types of layers, i.e., non-electrolytic Ni plating layer and an organic resin layer, it is possible to attain a noise reducing effect in addition to resistances to wear and corrosion.

In one form of the invention, the heat-treatment after the Ni plating is conducted at a temperature ranging between 300° C. and 500° C. and a cooling is conducted so as to generate numerous cracks in the non-electrolytic Ni plating layer. The layer of organic resin is then formed on the Ni-plating layer having cracks. As a result, the organic resin penetrate into the cracks so as to produce an anchoring effect, thereby attaining a high adhesion between the non-electrolytic Ni plating layer and the organic resin.

The above-described surface treatment may be conducted on both the male and female rotors. A similar effect can be obtained when the above-described surface treatment is conducted on one of the male and female rotors while the other rotor is provided with a non-electrolytic Ni plating layer alone.

The wear resistance can be enhanced when an engineering plastic having a comparatively high mechanical strength is used as the organic resin.

In order to reduce the difference in the thermal expansion between the rotor and the organic resin, the multi-layered structure may be formed such that an organic resin layer closer to the rotor surface is made of an organic resin having a smaller difference of thermal expansion coefficient from that of the rotor material than the organic resin which forms an organic resin layer remoter from the rotor material. It is also possible to reduce any stress caused by the difference in the thermal expansion by mixing powder of metal in the organic resin layers which form the multi-layered surface structure.

In one form of the surface treating method, a non-electrolytic Ni plating is applied to the rotor material, followed by lamination with organic resin layers formed by injection and electro-deposition, although this form of method is only illustrative.

In the second aspect of the present invention directed to a dry screw-type rotary machine, non-electrolytic Ni plating layers formed on the surfaces of the male and female rotors are heated at 500° C. to 650° C., so that fine crystal grain structure is formed in the plating layer so as to stabilize the plating layer. In addition, adhesion between the non-electrolytic Ni plating layer and the rotor is remarkably improved as a result of diffusion of constituents at the boundary between the non-electrolytic Ni plating layer and the rotor, thus suppressing wear and separation of the non-electrolytic Ni plating layer. Furthermore, since the male rotor and the female rotor rotate in contact with each another, the screw-type rotary machine can exhibit superior performance.

The non-electrolytic Ni plating layer formed on the rotor may be a porous layer which is impregnated with a solid lubricant such as BN or $MoS_2$. In such a case, the coefficient of friction between the rotors can be reduced to range between, for example, 0.1 and 0.2, by virtue of the presence of the solid lubricant. The solid lubricant tends to hold its crystalline state and, hence, hardly becomes separated powder. Therefore, the screw-type fluid machine can discharge a fluid with a high level of cleanliness which previously could be attained only by dry-type machines.

The above and other objects, features and advantages of the present invention will become clear from the following description of the preferred embodiments when the same is read in conjunction with the accompanying drawings.

BRIEF DESCRIPTION OF THE PREFERRED EMBODIMENTS

DESCRIPTION OF THE PREFERRED EMBODIMENTS

Figure 1:
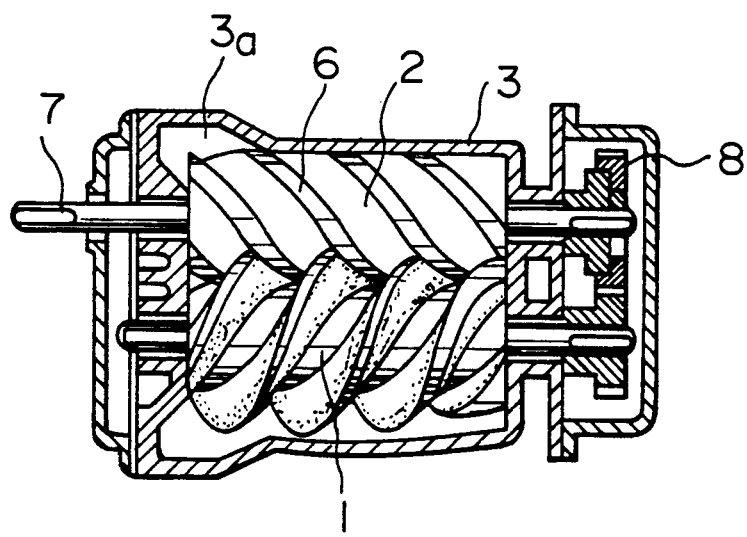
FIG. 1 is a longitudinal sectional view of a screw-type vacuum pump as an embodiment of the screw-type rotary fluid machine of the present invention.
Figure 2:
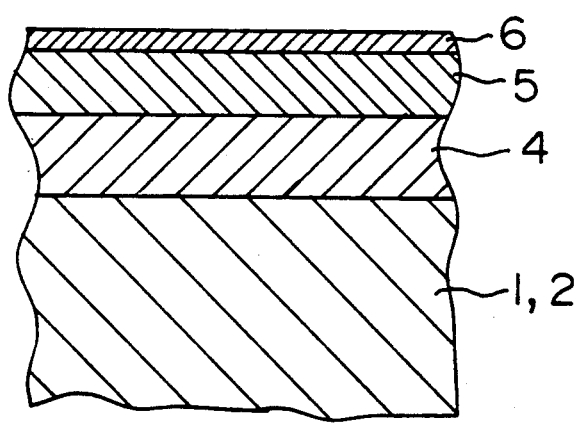
FIG. 2 is a longitudinal sectional view of a portion of the rotor shown in FIG. 1.
Figure 9:
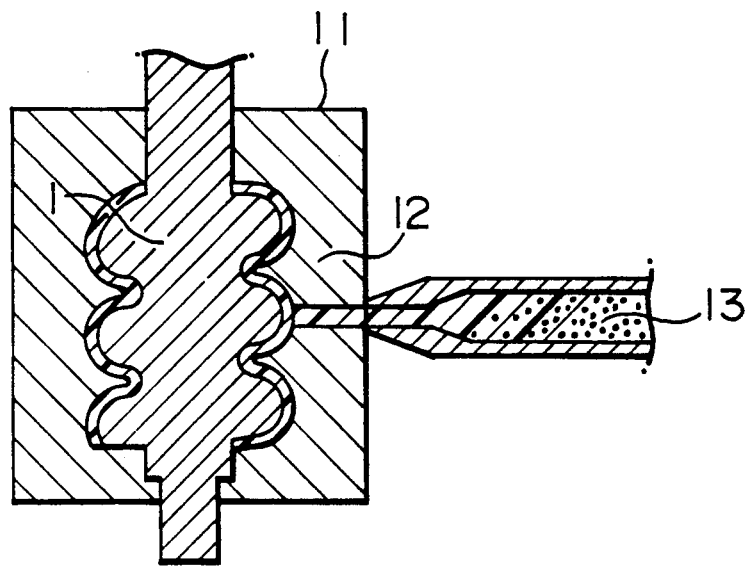
FIG. 9 is a sectional schematic view of an injection molding method used to provide a resin film on Ni-plating layer.

As shown in FIG. 1 the screw-type vacuum pump has a casing 3 defining an internal space 3a in which a male rotor 1 and a female rotor 2 mounted in a meshing relationship for rotation without contacting each other. The female rotor 2 is carried by a drive shaft 7 which is power driven so as to drive the female rotor 2. The male rotor 1 is carried by a shaft drivingly connected to the drive shaft 7 through a pair of gears 8 so that the male rotor 1 also is driven to rotate in synchronization with the rotation of the female rotor 1. Both the male rotor 1 and the female rotor 2 are made of a spheroidal graphite cast iron (FCD 55) and are surface-treated as shown in FIG. 2. More specifically, the surface of each of the male and female rotors 1 and 2 was treated by a process explained below. First, there was prepared a non-electrolytic Ni-P plating liquid containing main constituents of both $NiSo_4.6H_2O$ of 30 g/l and $NaH_2PO_2 \cdot H_2O$ of 10 g/l, sodium salt of organic acid, and an organic acid as a reaction-accelerating agent. The rotors 1 and 2 were dipped for about 2 hours in the plating liquid having a temperature of 60° C., so that a non-electrolytic Ni plating layer 4 of 20 μm in thickness was formed on each surface of the rotors 1, 2. Then, the rotors 1, 2 having the Ni plating layer 4 were maintained at 300° C. for one hour under an inert gas atmosphere or under a vacuum, followed by furnace-cooling. Consequently, there occurred cracks in the Ni-plating layers 4. In order to enhance the toughness and hardness of the Ni-plating layers 4 and to improve the adhesion between the main body of each of the rotors 1, 2 and the Ni-plating layer 4 by the occurrence of metal diffusion of Ni and Fe therebetween, the rotors 1, 2 were again held at 550° C. one hour under an inert gas atmosphere and then cooled in a furnace. Then, a polyphenylene sulfide resin layer 5 of about 5 mm thickness was formed on the Ni plating layer 4 by use of an injection molding method as shown in FIG. 9, so that polyphenylene sulfide resin penetrated into the cracks occurring in the Ni-plating layer 4 with the result being that an anchoring effect was brought about to integrate the polyphenylene sulfide resin 5 with the non-electrolytic Ni plating layer 4. In the injection molding method, the rotor was disposed in the split-type metal mold 11, and the polyphenylene sulfide resin having been plasticized by heating was fed under a high pressure through an injection tube 14 into a space defined between the rotor 1 and the metal mold 11, so that the layer 5 of the polyphenylene sulfide resin was provided on the Ni-plating layer 4.

Figure 10:
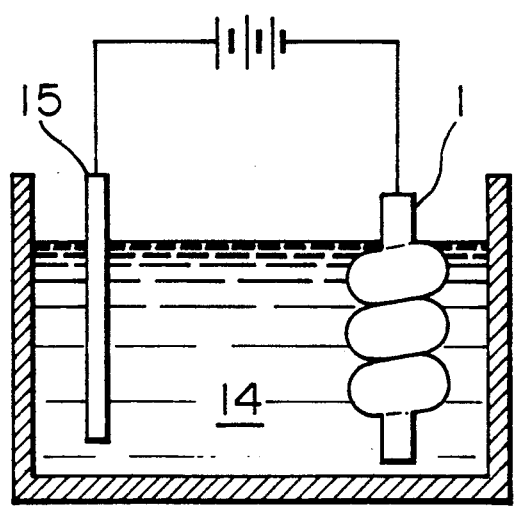
FIG. 10 is a schematic view of an electrodeposition method used in the invention.

In the next step, by using an electrodeposition process shown in FIG. 10, a coating layer 6 of an epoxy or fluoric resin having about 20 μm in thickness was adhered onto the surface of the layer 5. More specifically, onto the surface of the polyphenylene sulfide resin layer 5, Cu was evaporated to provide Cu coating thereon, then the rotor coated with Cu being immersed in an electrodeposition liquid 14 of about 30° C. in temperature, and an electrodeposition was effected 100 seconds at 200 V by using a stainless steel anode 15 and the cathode of the rotor so as to provide the layer 6. After drying the layer 6, the rotor was held at 180° C. for 30 minutes to bake the layer 6 to thereby complete the surface treatment.

The screw-type vacuum pump shown in FIG. 1 was formed by using the male and female rotors 1 and 2 which were subjected to the above-described surface treatment. More specifically, the vacuum pump shown in FIG. 1 is a single-stage dry-type pump used to produce semi-conductors and driven by a 2.2 kW motor and capable of discharging a gas at a rate of 100 l/minute at 50 Hz to achieve a vacuum of $10^{-1}$ Torr. Generally speaking, in conventional vacuum pumps of this type there occurred corrosion of rotors after the lapse of about 6-month operation. In contrast, the vacuum pump of this invention could operate for more than twelve months without any corrosion of rotors. In addition, the noise level was reduced by about 10% as compared with conventional vacuum pumps of this kind.

A description will now be given of a second embodiment of the present invention. The second embodiment incorporates rotors which were substantially the same as those used in the vacuum pump of the first embodiment except that the rotors were surface-treated by a process different from that of the first embodiment and in that both rotors was made to rotate in contact with each other.

More specifically, in the second embodiment, non-electrolytic Ni plating material was applied on the rotor surfaces by use of the same conditions as in the first embodiment and both rotors were heated at 600° C. for a predetermined time. Subsequently, a layer of a resin mixture composed of a polyimide resin and a fluoric resin was formed by the same injection mold method or electro-deposition as in the first embodiment on the surface of the non-electrolytic Ni plating layer on the male rotor, while no resin layer was formed on the non-electrolytic Ni plating layer on the female rotor.

A 1.5 kW screw compressor capable of compressing a gas to 7 $kgf/cm^2$ at maximum rotation speed of 40 m/s was assembled by using these rotors. About 10% reduction in the noise level as compared with the known compressor was confirmed, as well as about 15 to 20% improvement in the performance. After a long operation both rotors showed smooth surfaces without any abnormal wear caused by mutual contact of rotors.

A description will now be given of a third embodiment of the invention with reference to FIGS. 3 to 4C.

Figure 3:
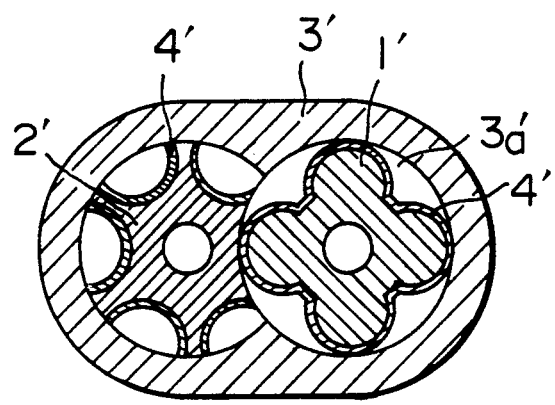
FIG. 3 is a longitudinal sectional view of a dry screw-type compressor as a third embodiment of the screw-type rotary fluid machine of the present invention.
Figure 4A:
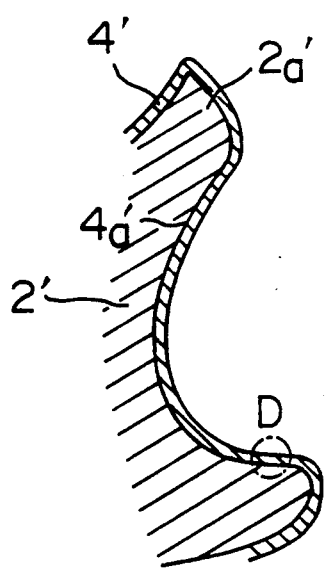
FIG. 4A is an enlarged sectional view of a female rotor incorporated in the compressor shown in FIG. 3.
Figure 4B:
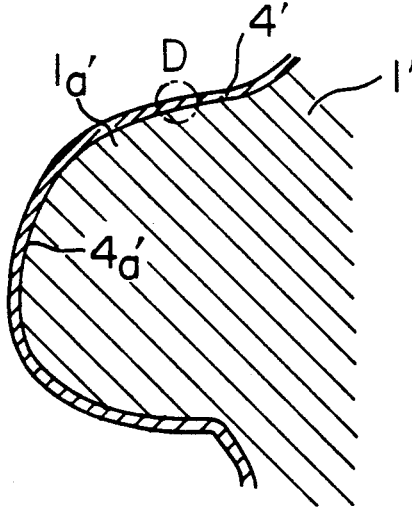
FIG. 4B is an enlarged sectional view of a male rotor incorporated in the compressor shown in FIG. 3.
Figure 4C:
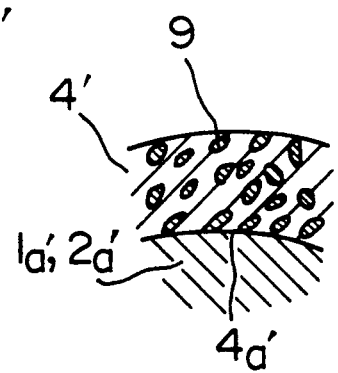
FIG. 4C is an enlarged sectional view of rotor surface regions encircled by broken-line circles D in FIGS. 4A and 4B.

Referring to FIGS. 3 to 4C, a later-mentioned surface treatment was effected on the surface of the main body 1a' of a male rotor 1'. Similarly, a later-mentioned surface treatment was effected on the surface of the main body 2a' of a female rotor 2'. The male and female rotors 1' and 2' was made to rotate in contact with each other. Numeral 3' denotes a casing.

The surface treatment was conducted in the following manner. A non-electrolytic 90% Ni-10% P plating material 4' was applied to the surface of each of the male rotor 1' and the female rotor 2' under the same conditions as in the first embodiment, and the rotor was heated at 600° C. for 1 hour, so that fine crystal grain structure of $Ni_3P$ was formed in the non-electrolytic Ni-P plating layer 4' which had been in an amorphous state, occupying about 70 to 80% this plating layer 4', so that the plating layer 4' was made stable. In addition, both Ni in the plating layer 4' and Fe in the main body 1' were diffused in the boundary layer 4a', so that the non-electrolytic Ni-P plating layer 4' could be strongly bonded to the boundary layer 4'a with a high adhesion. During the treatment, BN particles 9 were dispersed in the non-electrolytic Ni-P plating layer, thus completing the surface treatment. The dispersion of the BN particles 9 was effected by a process comprising the steps of mixing BN grains into the plating liquid of the Ni-P plating which BN grains had both a columnar shape and a longitudinal length of 0.5 to 1 $\mu$m; and immersing the rotor in the BN grains-mixed plating liquid while effecting the bubbling the plating liquid by injecting air thereinto so that the BN grains 9 was uniformly dispersed in the plating layer 4'.

The rotors 1' and 2' which were surface-treated in the described manner were assembled to form the dry screw-type compressor shown in FIG. 3, such that these rotors were made to rotate in contact with each other. This compressor exhibited a 15 to 20% higher improved performance as compared with conventional non-contact dry-type screw compressors having an efficiency in the degree of about 50% and could discharge a fluid with a high degree of cleanness.

A description will now be given of a fourth embodiment of the invention with reference to FIGS. 5 to 6C.

Figure 5:
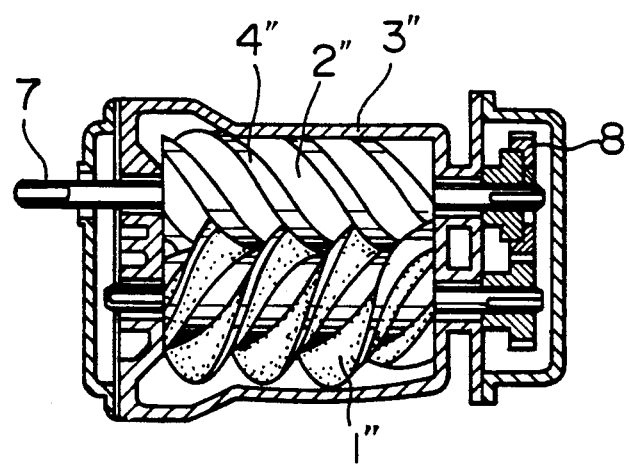
FIG. 5 is a longitudinal sectional view of a dry screw-type vacuum pump as a fourth embodiment of the screw-type rotary fluid machine of the present invention.
Figure 6A:
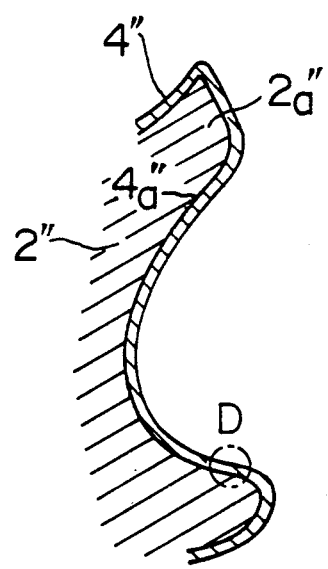
FIG. 6A is an enlarged sectional view of a female rotor incorporated in the compressor shown in FIG. 5.
Figure 6B:
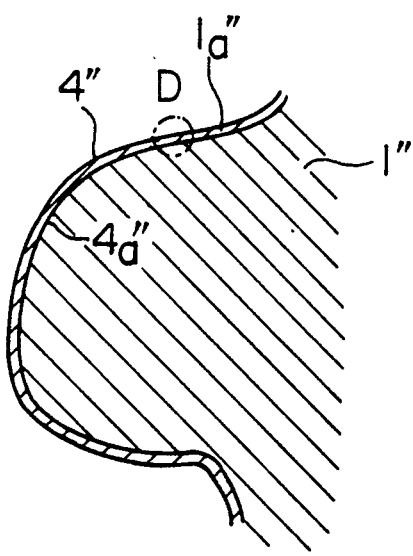
FIG. 6B is an enlarged sectional view of a male rotor incorporated in the compressor shown in FIG. 5.
Figure 6C:
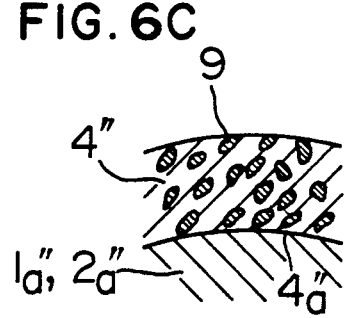
FIG. 6C is an enlarged sectional view of rotor surface regions encircled by broken-line circles D in FIGS. 6A and 6B.

Referring to FIGS. 5-6C, a later-mentioned surface treatment was effected on the surface of itself 1a'' of a male rotor 1''. Similarly, a later-mentioned surface treatment was effected on the surface of the parts 2a'' of a female rotor 2'. The male and female rotors 1'' and 2'' were made to rotate in contact with each other. Numeral 3'' denotes a casing.

Since the surface treatment was conducted in the same manner as in the third embodiment, the description of the surface treatment is omitted.

The rotors 1'' and 2'' which were surface-treated in the described manner were assembled to form the dry screw-type vacuum pump shown in FIG. 5, such that these rotors were made to rotate in contact with each other. This vacuum pump showed superior performance and high degree of cleanliness of the discharged fluid as in the case of the third embodiment.

A description will now be given of a fifth embodiment of the invention with reference to FIGS. 7 to 8C.

Figure 7:
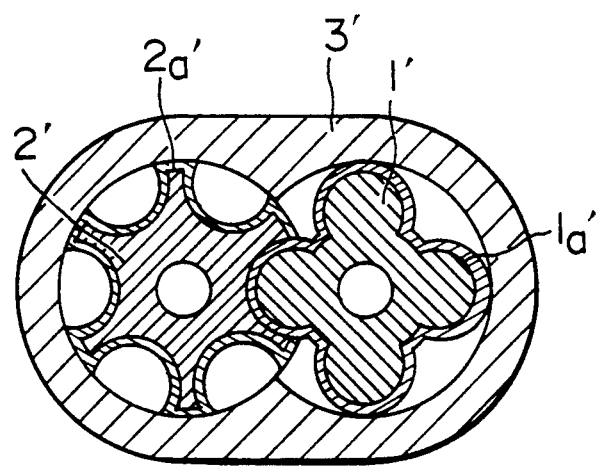
FIG. 7 is a longitudinal sectional view of a dry screw-type rotary fluid machine as a fifth embodiment of the screw-type rotary fluid machine of the present invention.
Figure 8A:
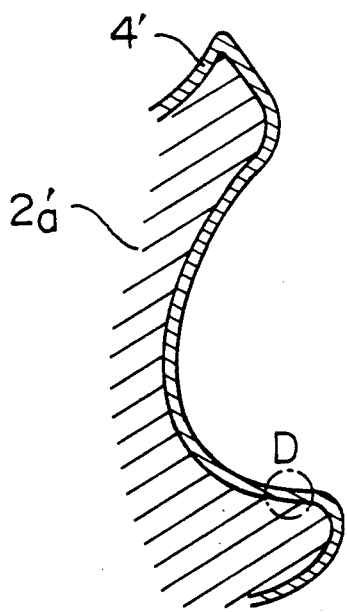
FIG. 8A is an enlarged sectional view of a female rotor incorporated in the compressor shown in FIG. 7.
Figure 8B:
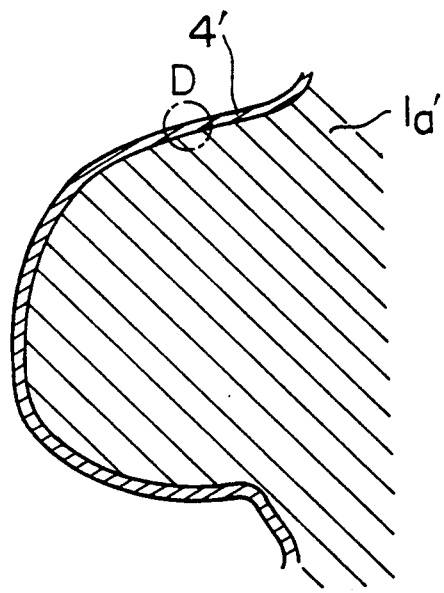
FIG. 8B is an enlarged sectional view of a male rotor incorporated in the compressor shown in FIG. 7.
Figure 8C:
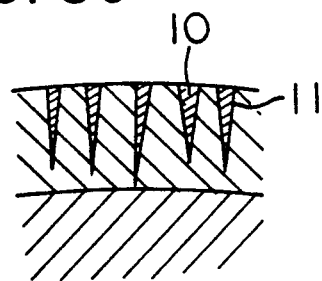
FIG. 8C is an enlarged sectional view of rotor surface regions encircled by broken-line circles D in FIGS. 7A and 7B.

Referring to FIGS. 7-8C, a later-mentioned surface treatment were effected on the surface of itself 1a' of a male rotor 1'. Similarly, a later-mentioned surface treatment has been effected on the surface of the parts 2a' of a female rotor 2'. The male and female rotors 1' and 2' were made to rotate in contact with each other. Numeral 3' denotes a casing.

The surface treatment was conducted in the following manner. A non-electrolytic Ni-P plating material 4' of about 20 $\mu$m thick was applied, by using the same process and conditions as in the first embodiment, to the surface of each of the male rotor 1' and the female rotor 2', and the rotor was heated at a temperature of 300° C. to 500° C. for 1.5 hours, so that cracks 10 were generated in the surface of the non-electrolytic Ni-P plating layer 4' at the side opposite to the main body 1a' or 2a' as shown in FIG. 8C. Then, the Ni-P plating layer 4' was impregnated with tetrafluoroethelene resin (PTFE) 11 of 10 to 20 $\mu$m thick so that PTFE filled the cracks 10, thus completing the surface treatment.

The rotors 1' and 2' thus surface-treated were assembled to form the dry screw-type rotary fluid machine of FIG. 7 such that these rotors 1' and 2' was made to rotate in contact with each other. Superior performance and high degree of cleanness of discharged gas were confirmed as in the cases of the third and fourth embodiments.

As will be understood from the foregoing description, the present invention offers the following advantages.

According to the invention, there is provided a screw-type rotary fluid machine comprising at least one male rotor and at least one female rotor which rotate within a casing, at least one of the male and female rotors being surface-treated to have a treated surface structure which is a multi-layered structures composed of a plurality of layers including a non-electrolytic Ni plating player and at least one organic resin covering layer. This feature improves resistances to wear and corrosion, as well as adhesion between the layers and the main body of the rotors, while reducing noise and friction.

The invention also provides a method comprising conducting a non-electrolytic Ni plating on the surface of each rotor so as to form a first layer of non-electrolytic Ni plating layer, heating the rotor having the first layer at a temperature not lower than 500° C. for a predetermined time, and forming, at least, a second layer of an organic resin so as to cover the first layer. According to this method, it is possible to improve resistances to wear and corrosion, while reducing noise, without allowing cracks to be generated in the first layer composed of the non-electrolytic Ni plating layer.

The invention also provides another method which comprises conducting a non-electrolytic Ni plating on the surface of each rotor so as to form a first layer of non-electrolytic Ni plating layer, heating the rotor having the first layer at a temperature ranging between 300° C. and 500° C. for a predetermined time, cooling the rotor to generate cracks in the non-electrolytic Ni plating layer, heating the rotor having the non-electrolytic Ni plating layer at a temperature not lower than 500° C. for a predetermined time, and forming, at least, a second layer of an organic resin so as to cover the first layer. According to this method, it is possible to obtain a stronger adhesion between the non-electrolytic Ni plating layer and the organic resin layer because the non-electrolytic Ni plating layer is impregnated with the organic resin which fills the cracks formed in the plating layer.

The present invention also provides a dry screw-type rotary fluid machine, comprising at least one male rotor and at least one female rotor which rotate within a casing, wherein each rotor surface is provided with a non-electrolytic Ni-P plating layer which is treated to have a fine crystal grain structure while allowing diffusion of constituents at the boundary between the plating layer and the rotor material. It is therefore possible to improve resistances to corrosion and wear, while ensuring high degree of cleanliness of the discharged fluid, even though the rotors rotate in contact with each other.

When the non-electrolytic Ni plating layer is impregnated with a solid lubricant, a reduced friction and a high degree of cleanness of the discharged fluid can be obtained simultaneously.

The invention also provides a method of treating the surfaces of rotors in a dry screw-type rotary fluid machine having male and female rotors rotatable in a casing, the method comprising forming a non-electrolytic Ni plating layer on the surface of each roll, and heat-treating the rotor surface carrying the non-electrolytic Ni plating layer at a temperature ranging between 500° C. and 650° C., thereby producing fine crystal grain structure of $Ni_3P$ in the non-electrolytic Ni plating layer while allowing diffusion of constituents at the boundary layer between the rotor surface and the non-electrolytic Ni plating layer. According to this method, it is possible to improve the adhesion or strength of bonding between the non-electrolytic Ni-P plating layer and the rotor while minimizing wear and excoriation of the non-electrolytic Ni plating layer.

What is claimed is:

1. A method of treating a surface of rotors disposed in a screw rotary fluid machine having at least one male rotor and at least one female rotor rotatable in a casing, the method comprising the steps of: conducting a non-electrolytic Ni plating on the surface of each rotor so as to form a first layer of a non-electrolytic Ni plating layer; heating said rotor having said first layer at a temperature not lower than 500° C.; and forming, at least, a second layer of an organic resin so as to cover said first layer.

2. A method of treating a surface of rotors disposed in a screw rotary fluid machine having at least one male rotor and at least one female rotor rotatable in a casing, the method comprising the steps of: conducting a non-electrolytic Ni plating on the surface of each rotor so as to form a first layer of a non-electrolytic Ni plating layer; heating said rotor having said first layer at a temperature ranging between 300° C. and 500° C.; cooling said rotor to generate cracks in said non-electrolytic Ni plating layer; heating said rotor having said non-electrolytic Ni plating layer at a temperature not lower than 500° C.; and forming, at least, a second layer of an organic resin so as to cover said first layer.

3. A method according to claim 1, wherein said second layer is formed by one of injection forming and electro-deposition with one kind of resin selected from a group of engineering plastics, and a further covering layer is formed to cover said second layer by one of electro-deposition and injection forming from one kind of resin or a mixture of two or more resins selected from the group of engineering plastics.

4. A method according to claim 2, wherein said second layer is formed by one of injection forming and electro-deposition with one kind of resin selected from a group of engineering plastics, and a further covering layer is formed to cover said second layer by one of electro-deposition and injection forming from one kind of resin or a mixture of two or more resins selected from the group of engineering plastics.

5. A method according to claim 1, wherein said second layer is formed by one of injection forming and electro-deposition with a mixture of resins selected from a group of engineering plastics, and a further covering layer is formed to cover said second layer by one of electro-deposition and injection forming from one kind of resin selected from the group of engineering plastics.

6. A method according to claim 2, wherein said second layer is formed by one of injection forming and electro-deposition with a mixture of resins selected from a group of engineering plastics, and a further covering layer is formed to cover said second layer by one of electro-deposition and injection forming from one kind of resin selected from the group of engineering plastics.

7. A method of treating a surface of rotors disposed in a dry screw rotary fluid machine having at least one male rotor and at least one female rotor which rotate within a casing in contact with each other, the method comprising: forming a non-electrolytic Ni plating layer on the surface of each rotor, and heat-treating the rotor surface carrying said non-electrolytic Ni plating layer at a temperature ranging between 500° C. and 650° C., thereby producing fine crystal grain structure in the non-electrolytic Ni plating layer which allowing a diffusion of constituents of both the Ni plating layer and the main body of the rotor at a boundary layer between the rotor surface and said non-electrolytic Ni plating layer.

8. A method of treating a surface of a rotor disposed in a dry screw rotary fluid machine having at least one male rotor and at least one female rotor which rotate within a casing in contact with each other, the method comprising the steps of: conducting a non-electrolytic Ni plating on the surface of each rotor so as to form a non-electrolytic Ni plating layer; heating said rotor having said first layer at a temperature ranging between 300° C. and 500° C.; causing cracks to be generated in said non-electrolytic Ni plating layer; heating said rotor having said non-electrolytic Ni plating layer at a temperature not lower than 500° C., and impregnating said non-electrolytic Ni plating layer with a solid lubricant.

* * * * *